Nov. 27, 1956 W. H. LYON 2,772,328

AUTOMATIC SYNCHRONIZATION APPARATUS FOR LONG-TIME TRANSVERSE MAGNETIC SOUND RECORDER AND REPRODUCER

Filed April 28, 1952 3 Sheets-Sheet 1

INVENTOR.
WILLIAM H. LYON
BY
H. G. Manning
ATTORNEY

Nov. 27, 1956 W. H. LYON 2,772,328

AUTOMATIC SYNCHRONIZATION APPARATUS FOR LONG-TIME TRANSVERSE MAGNETIC SOUND RECORDER AND REPRODUCER

Filed April 28, 1952 3 Sheets-Sheet 2

INVENTOR.
WILLIAM H. LYON
BY H. G. Manning
ATTORNEY

Nov. 27, 1956 W. H. LYON 2,772,328

AUTOMATIC SYNCHRONIZATION APPARATUS FOR LONG-TIME TRANSVERSE MAGNETIC SOUND RECORDER AND REPRODUCER

Filed April 28, 1952 3 Sheets-Sheet 3

INVENTOR.
WILLIAM H. LYON
BY
H. G. Manning
ATTORNEY

United States Patent Office 2,772,328

Patented Nov. 27, 1956

2,772,328

AUTOMATIC SYNCHRONIZATION APPARATUS FOR LONG-TIME TRANSVERSE MAGNETIC SOUND RECORDER AND REPRODUCER

William H. Lyon, Orange, Conn., assignor to The Soundscriber Corporation, New Haven, Conn., a corporation of Connecticut Application April 28, 1952, Serial No. 284,716

12 Claims. (Cl. 179—100.2)

This invention relates to sound recording and reproducing devices, and more particularly to a long-playing magnetic recording and play-back apparatus wherein the sound is recorded transversely on a wide flexible strip of tape coated on one side with an emulsion of magnetic oxide particles.

One object of this invention is to provide a practical recording and reproducing apparatus of the above nature wherein a series of successive, parallel, arcuate sound tracks may be impressed laterally across a slowly moving recording tape by means of a plurality of electro-magnetic transducer heads radially disposed on a rotating turntable member.

A further object is to provide an automatic adjustable apparatus for controlling the tape-feeding mechanism, whereby the recorded sound tracks on the tape may automatically be brought into synchronism with the scanning pole faces during playback.

A further object is to provide a novel mechanism and apparatus of the above nature having means whereby the tape may quickly and easily be threaded into the apparatus both for recording and playback.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

The present application relates to an improvement over the invention disclosed in a copending application filed November 7, 1951, by Lincoln Thompson, Frank E. Runge, and William H. Lyon, S. N. 255,184, entitled Long Playing Magnetic Tape Recorder.

Figure 1:
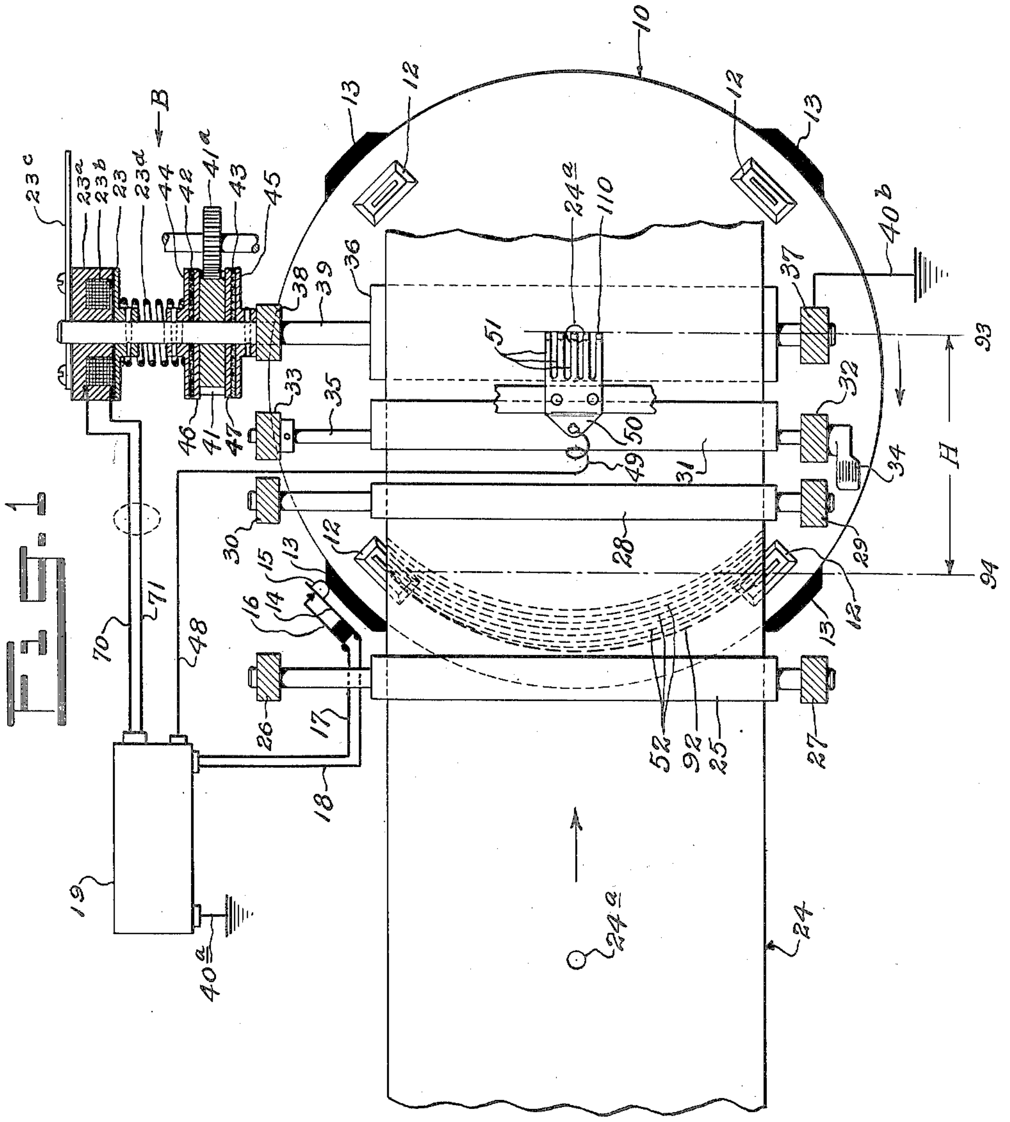
Fig. 1 represents a partially diagramatic top view of an automatic synchronizing apparatus embodying the present invention, showing the brake clutch mechanism in cross-section.

The purpose of the present automatic synchronizing apparatus is to periodically realign the magnetic heads of the scanning turntable of a transverse type, long-time magnetic recorder with the arcuate tracks recorded thereon at certain fixed points on the magnetic tape. This eliminates the necessity of frequent manual realignment when the tape tends to drift away from synchronization because of dimensional changes in the tape caused by humidity, temperature, aging, etc.

The realignment occurs, according to the present invention, both during recording and playback, and takes place whenever any one of a series of spaced reference points located upon the tape is reached. At that time, an electrical impulse will be produced which initiates the synchronizing action.

In the operation of the present apparatus, synchronization is accomplished by momentarily stopping the tape feed for a short period commencing at each reference point, and continuing until the tape is started again by the action of a cam.

Referring now to the drawings in which like reference numerals denote corresponding parts throughout the several views, the numeral 10 indicates a horizontal, continuously rotated, turntable mounted upon a vertical spindle 11 connected to a driving motor (not shown). The turntable 10 is provided with a plurality (four in this instance), of magnetic transducer heads 12 disposed at 90° intervals around the circumference of said turntable.

On the under surface of, and projecting out beyond the turntable 10, provision is made of four insulating beveled cams 13 which are herein disclosed as in alignment with the transducer heads 12.

Figure 3:
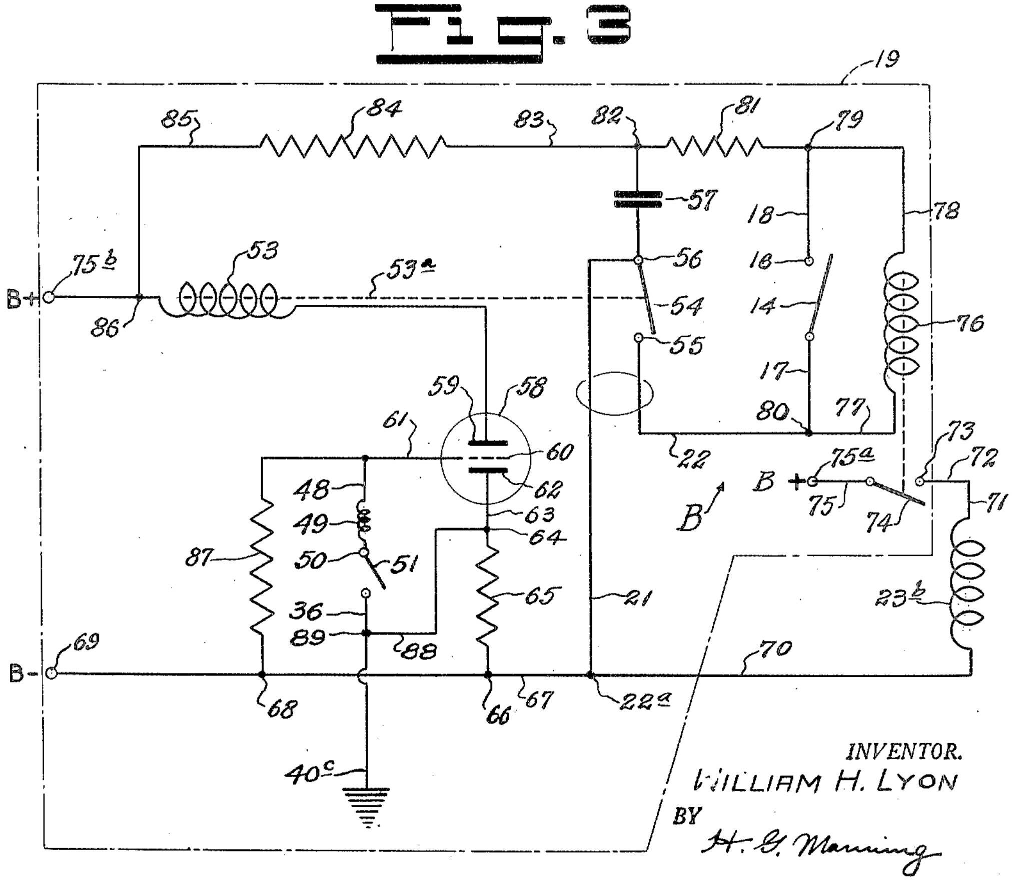
Fig. 3 is an electrical circuit diagram of the automatic synchronizing apparatus.

Located outside the turntable 10, in the path of the cams 13, is a round button 15 carried by a movable switch arm 14 which is adapted to engage a resilient stationary switch arm 16 connected by wires 17, 18 respectively, to an amplifier located in a housing 19 (Figs. 1 and 3).

The numeral **40*a* indicates a ground wire connected to the amplifier. Provision is also made of a junction 22*a* (Fig. 3), connecting a wire 21 to a pair of wires 67, 70, to be hereinafter described. The wires 70 and 71 are included in a common cord passing from the housing 19 to a coil 23*b*** of a magnetic brake B.

The magnetic brake B comprises a rotor 23 and a stator **23*a*, the latter enclosing the electrical coil 23*b*. The stator 23*a* is fixed to the frame 23*c*** of the recorder.

As clearly shown in Fig. 1, the rotor 23 is pinned to a horizontal shaft 39 of a metallic feed roller 36. A clutch plate 44 is slidably pinned to said shaft 39 at one side of a drive gear 41 which is continuously driven by a motor-driven gear **41*a*. A similar clutch plate 45 is rigidly pinned to the shaft 39 at the other side of the gear 41**.

The drive gear 41 is embraced by a pair of slip washers 42, 43, attached to the clutch plates 44, 45, and said washers are normally held in driving contact with the faces of the gear 41 by a coiled spring **23*d***.

The tape upon which the tracks are to be magnetically recorded is indicated by the numeral 24, and said tape is provided upon its underside with a coating of magnetic oxide material. The tape 24 has a series of circular contact holes **24*a*** punched therein, which are preferably regularly spaced about six inches apart.

Figure 2:
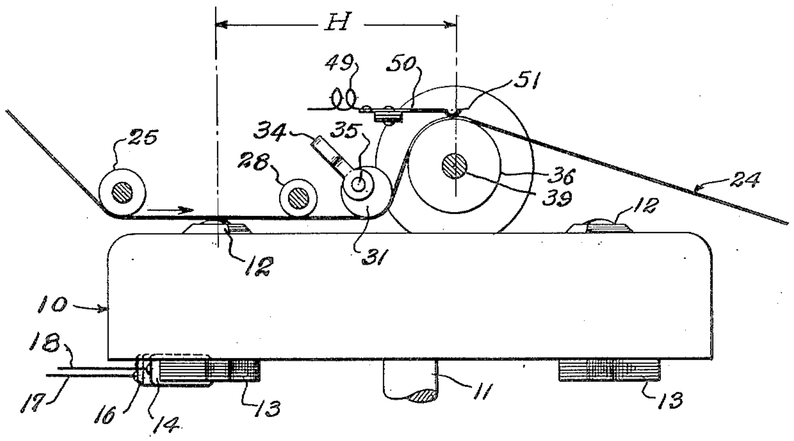
Fig. 2 is a front view of the same.

In order to guide the tape 24 smoothly through the recording apparatus, provision is made of a cylindrical guide roller 25 (Figs. 1 and 2), preferably formed of steel, and mounted in bearing bushings 26, 27, and provision is also made of a second guide roller 28 mounted in a pair of bearing bushings 29, 30 (Fig. 1), from which roller the tape passes under an eccentric roller 31 mounted in bearing bushings 32, 33. A control handle 34 rigidly secured to a shaft 35, located eccentrically within the roller 31, is employed to manually control the length of the tape 24 between the heads 12 and the contact points **24*a***, as will be hereinafter more fully described.

The friction drive roller 36, which is of relatively large diameter, is mounted in bearing bushings 37, 38, the bushing 37 being connected to a ground wire **40*b***.

In order to cause the magnetic transducer heads 12 to be periodically brought back into accurate synchronism with the recorded arcuate tracks on the tape 24, provision is made of a wire 48 (Figs. 1 and 3), having a flexible connection 49 to a contact plate 50 provided with a plurality of resilient fingers 51 which are adapted to engage the metallic tape driving roller 36 through the circular holes 24*a* on the tape, whenever said holes pass under said fingers.

Each time the stator coil 23*b* is energized, the rotor 23 is attracted to the stator and the shaft 39 is held from rotation, the gear faces 46, 47 being permitted to slip with respect to the washers 42, 43.

The numerals 52 (Figs. 1 and 4) indicate a series of substantially parallel arcuate sound tracks which are impressed upon the tape 24 by the action of the heads 12 during the recording process.

Provision is also made of a relay coil 53 (Fig. 3), connected with the plate or anode 59 of a 3-element thermionic tube 58, having a grid 60 and a cathode 62, said grid 60 being connected to the metal drive roller 36, by a wire 61.

The coil 53 actuates a magnetic core 53*a*, mechanically connected with a movable arm 54 of a relay switch having a stationary contact 55, and also connected to a junction 56 leading to a capacitor 57 and to a junction 82.

Provision is also made of a resistor 65 connected to a junction 64, joined to the cathode 62 by a wire 63, and to a junction 66 and a wire 67 leading to a junction 68 connected to a B— terminal 69, as clearly shown in Fig. 3.

Connected to the brake coil 23*b* is a wire 71 (Fig. 3), leading to a fixed contact 73, which is adapted to be engaged by a movable switch arm 74 connected by a wire 75 to the "B+" contact 75*a* of the apparatus.

The movable switch arm 74 which controls the brake coil 23*b* is actuated by means of a relay coil 76 connected by a wire 77 to a junction 80, and by a wire 78 to a junction 79, leading to a resistor 81 which is connected to a junction 82.

A wire 83 connects the junction 82 to a resistor 84 connected to a wire 85, which is joined to a junction 86 which leads to a second "B+" contact 75*b*. The junction 86 is also connected to the relay coil 53.

Provision is also made of a grid leak resistor 87 connected to the grid wire 61 at one end, and to the junction 68 at its other end. A wire 88 connects the junction 64 to a junction 89.

*Operation*

The operation of the synchronizing device can best be explained by reference to Figs. 1 and 4. Thus, during normal recording and playback, the four identical magnetic transducer heads 12 revolving with the turntable 10, will successively wipe across the magnetic oxide coating of the slowly advancing tape 24, in a circular scanning arc 92.

The friction drive roller 36 draws the magnetic tape 24 past the scanning arc 92, where the recording takes place as the moving heads successively contact the magnetic surface of the tape.

All of the heads 12 are identical, and each head records for slightly over 90 degrees of the rotation of the turntable 10. It will be understood, of course, that there is a slight overlap when changing from one head to the next, and that any one of the four magnetic heads 12 can play back any track made by itself or any of the other three heads.

The synchronizing cycle takes place during the 90 degrees recording or reproducing sweep of any one of the heads 12 across the tape 24. The exact time of the beginning of the synchronizing cycle is determined by the instant that electrical contact is broken between the brush fingers 51 and the metallic drive roller 36 under the magnetic tape 24 through the reference hole 24*a*. A synchronizing impulse will then go to the amplifier 19, and will energize the magnetic brake coil 23*b* through the contacts operated by the relay coils 53 and 76, causing the rotor 23 to grip tightly on the stator 23*a* and the washers 42, 43 to slip, thus stopping the rotation of the drive roller 36 and checking the forward motion of the tape 24. The tape 24 will remain stopped until the head 12 which was on the tape when the synchronizing impulse was initiated reaches the edge of said tape.

At this instant, the cam 13 which is aligned with the same head 12 will strike the button 15 and cause the movable switch contact 14 to engage the fixed contact 16. The closing of the switch contacts 14, 16 will short-circuit the relay coil 76, allowing its contacts to open and instantly deenergize the coil 23*b*. The drive roller 36 will thus be unlocked, permitting the tape 24 to feed again in the normal way.

In other words, if at any time the tape 24 "gets out of synchronism," the two sets of switches 51—36, and 14—16, respectively, will coact in such a fashion that the drive gear 14 will cease transmitting its continuous rotary motion to the drive roller 36 for the time period required for a head 12 to pass from the aperture 24*a* to the edge of the tape 24.

In order to explain the coordinated action of the two automatically-operated switches mentioned above, reference will now be made to Fig. 3. Normally the cathode 62 is connected to the grid 60 through the wire 63, the resistor 65, the wire 67, the grid resistor 87 and the wire 61. It will be noted, however, that when the contact fingers 51 engage the metallic roller 36, they will connect the grid 60 of the tube 58 directly to the cathode 62 through the wires 48, 88, and 63. This causes an increased current to flow through the relay coil 53 closing the contacts 54, 55 and admitting current from the charged capacitor 57 to the relay coil 76, thus closing contacts 73, 74, and admitting current to the brake coil 23*b*. This stops the forward movement of the tape 24 until the contacts 14, 16 are closed, short-circuiting the relay coil 76, interrupting the current through the brake coil 23*b*, permitting the feed to again resume in normal fashion.

The distance H between the reference points 93, 94 (Fig. 1) as set up by the tip of the transducer head 12 at the point where said head leaves the tape on the scanning arc 92, may vary slightly due to mechanical tolerances between different recording machines. The use of the adjusting eccentric roller 31 makes it possible to play back a recorded tape on machines with such mechanical variations. The eccentric roller 31 located between the feed roller 35 and the scanning arc 92 permits changing the length of tape between the reference points 93, 94, so that a single adjustment can be made for initial synchronization on any playback machine when mechanical tolerances such as location of the brush tips 12 are slightly different on a playback machine from those on the recording machine.

It will be understood that the eccentric roller 31 also permits the operator to synchronize the heads 12 with the recorded track when the automatic synchronizing mechanism is not used and that the synchronizing process during recording will compensate for irregularity in the spacing of the synchronizing holes 24*a*.

Moreover, since the tape 24 expands and contracts with humidity, mechanical tolerances will cause slight changes in "feed" which will be accumulative, the synchronizing process during reproduction will compensate for such changes.

The recorded track begins on the area of the tape in section 95 (Fig. 4), and is indicated by solid black lines 52. The path followed by the magnetic heads in playback normally is indicated by the arcuate lines 52, but when it begins to drift away and become unsynchronized, the path of the head is indicated by a dotted line 97. The path of the magnetic heads during the synchronizing interval, when the tape feed is stopped, is indicated by the double dotted lines 98, 99 and is the same as the circular scanning arc 92.

In recording, the arcuate sound tracks 52 produced by the magnetic heads sweeping across the moving tape 24, occur at equally spaced intervals through the section 95 until the reference hole 24a causes the beginning of the recording alignment cycle. At this instant, a recording head 12 may be at the point 96. Since the tape feed then stops the normal arcuate sound track path 52 will cease and the head 12 will follow a circular arc which coincides with the scanning arc 92 as indicated by the double dotted lines 98, 99.

When the head reaches point 100 at the edge of the tape, the cam switch 14, 16 will close and will cause the tape feed to again continue in the normal manner. The recorded sound track 52 will again continue on equally spaced arcs through the next section 101, until the second reference hole 24a is reached, causing another recording cycle to occur. At this instant, another recording head 12 may be at point 101a and the recording alignment cycle will be repeated while said head travels from the point 101a to the tape edge point 102.

These cycles will continue periodically throughout the length of the tape, as initiated by the reference points, at approximately two to four minute intervals. A tape recorded in this manner will be properly aligned for automatic playback synchronization in the same manner as the original recording alignment.

Figure 4:
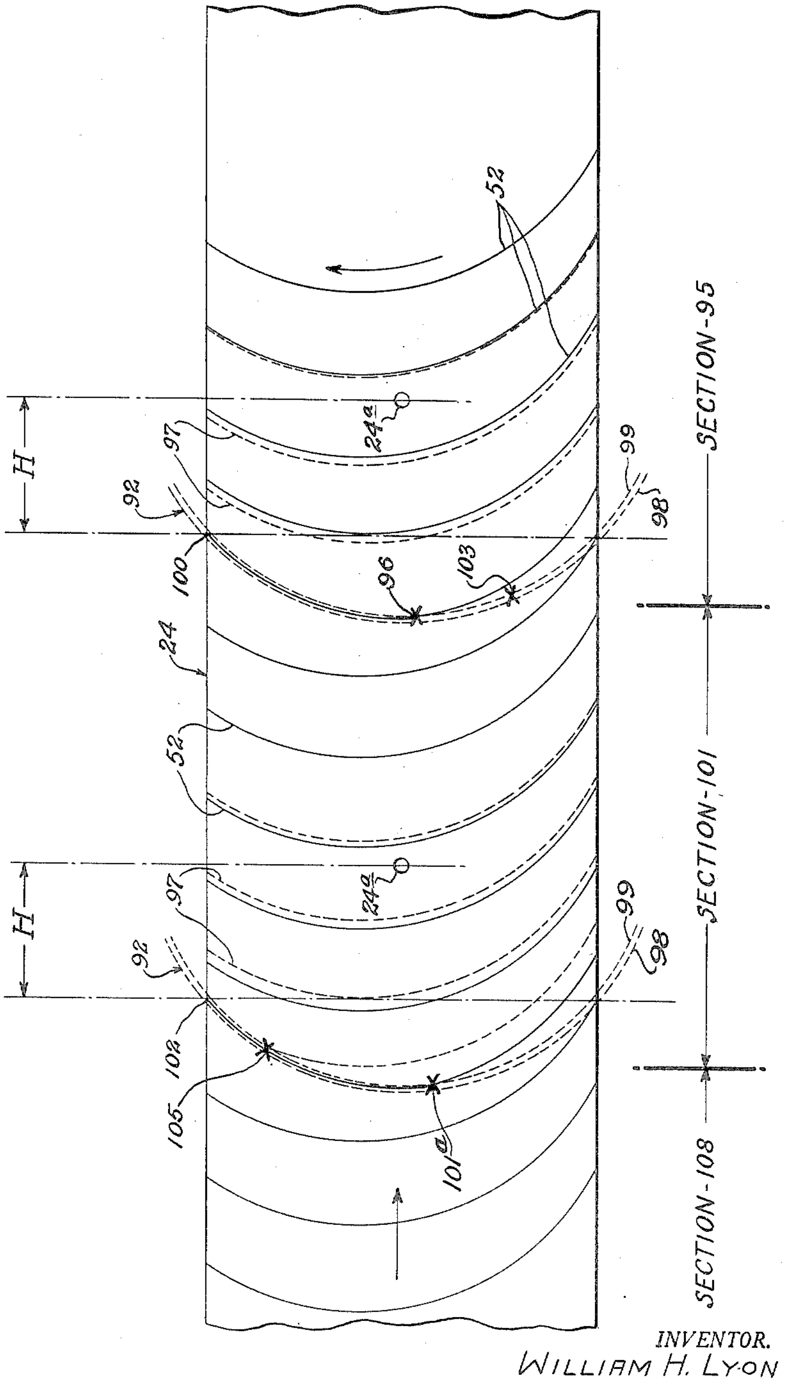
Fig. 4 is a chart illustrating in an exaggerated manner, and on a greatly enlarged scale, the track spacing of two complete synchronizing cycles effected by the apparatus herein disclosed.

In the playback of the sample section of tape illustrated in Fig. 4, the process begins in section 95 with the playback heads following a curve perfectly coinciding with the previously recorded arcuate sound tracks 52. As the playback continues, the heads 12 may begin to follow a path 97 more and more ahead of the recorded track 52, if there has been any shrinkage of the recording tape from humidity or temperature changes or if the "feed" of the playback apparatus is at a different rate from that of the recording apparatus.

It will be understood that while some misalignment between recording and playback is permissible without deterioration of the reproduction, since the sound tracks actually have appreciable width (not indicated); the function of the realignment is to re-synchronize the playback heads with the sound track before the misalignment becomes great enough to cause excessive deterioration of reproduction.

Since the circular track 97 being followed by the playback heads is slightly ahead of the recorded arcuate sound track 52, the location of the operating head at the instant of the realignment cycle will be different from the location of the recording head 12 at the corresponding instant. Assuming for example, that the head 12 is at the point 103, the path being followed by said head will follow an arc which coincides with the scanning arc 92. When the head 12 reaches the point 96, the playback path 97 will coincide exactly with the sound track 52. The tape feed will then remain stopped until the head 12 reaches the edge point 100.

Section 101 of Fig. 4 illustrates in an exaggerated fashion what happens in playback if the tape has expanded or if the "feed" of the playback mechanism is different than in the recording machine. Here the playback path 97 soon begins to lag behind the recording path 52.

Assuming the playback head to be at point 105, when the tape feed is stopped for the beginning of the synchronizing cycle, this point is on the scanning arc 92 and is exactly aligned with the recorded track 52. The tape feed will then remain stopped until the head 12 reaches the edge point 102 as in the recording. The paths 92, 97, will thereafter coincide until the variation in the tape caused by humidity or temperature causes the two paths to again drift apart by an amount which will initiate the next synchronizing cycle.

It will be understood that the period between the engagement of the brush fingers 51 with the metal drive roller 36, and the time when the cam 13 closes the switch contacts 14, 16, will always be sufficient to bring the scanning head 12 into exact synchronism with a track 52 recorded on the tape 24.

If a head 12 should be at the edge of the tape, such as points 102 or 100, at the moment the realignment cycle starting impulse occurs, the cam switch will squelch the braking action and nothing will happen. This condition occurs only when the recording and playback paths are in perfect synchronization and there is no need for realignment.

The alignment between the magnetic heads 12 and the tape 24 is set up during the recording process and will be maintained during the playback process in exactly the same manner.

To set the machine so that it will play back a tape with automatic synchronization, the tape will first be threaded into the machine, and when the realigning reference hole 24a is reached, a synchronizing cycle will be initiated. The cam handle 34 will then be adjusted to produce the loudest and clearest signal possible. From this point on, during the operation of the machine, the original alignment will be maintained automatically.

If for any reason, it is desired to play back the tape 24, the instant the machine is started without waiting for a realignment mark to be reached, the handle 34 on the eccentric roller 31 may be operated manually and the apparatus resynchronized whenever a reference point is passed, if necessary. Synchronization will be maintained automatically from this point on.

It is to be understood that, while in the embodiment of the invention herein disclosed, the reference point is a hole punched in the tape in such a manner that brushes riding on the top of the tape will complete the electrical circuit through said hole and the drive roller beneath the tape, the invention is not limited to such a reference point, but also includes a short transverse line printed on the back of the tape with an electrical conducting ink such as used in printed circuits, within the spirit and scope of the present invention. In such a case, the synchronizing impulse will be caused by the conductive mark passing under two brushes.

It will also be understood that the impulse may be generated by an electric eye picking up a reference mark printed on the back of the tape, or picking up a light beam projected through a perforation in the tape, within the scope of this invention.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an apparatus for magnetically recording intelligence as a series of transverse tracks on a moving flexible magnetic tape, means for feeding said tape longitudinally through said apparatus, a rotatable tape support located under said tape and carrying a plurality of electromagnetic heads equally spaced around the circumference of said support for impressing successive, spaced transverse tracks across said tape, periodically operated means actuated by a small movement of said tape to stop it automatically for a short interval of time to reduce the clearance between successive recorded transverse tracks and the path of said heads in order to compensate for misalignment which may have occurred due to shrinkage or expansion of said tape, so as to bring said recorded tracks back into proper synchronism with the path of said transducer heads, and cam means on said rotatable support to automatically start the feeding of said tape again.

2. In an apparatus for magnetically recording intelligence as a series of transverse tracks on a moving flexible magnetic tape, a horizontal shaft having a tape-feeding roller thereon, a rotatable support located under said tape and carrying a plurality of electromagnetic transducer heads equally spaced around the circumference of said support, periodically-operated means responsive to a predetermined small movement of said tape to stop said tape automatically for a short interval of time to reduce the clearance between successive recorded transverse tracks and the paths of said heads in order to compensate for any misalignment which may have occurred due to shrinkage or expansion of said tape, so as to bring said recorded tracks back into proper synchronism with said transducer heads, and automatically operated means to thereafter start the feeding of said tape again, said tape stopping means including slip friction means for driving said tape feeding roller and an electromagnetic brake for clamping said shaft to temporarily prevent the rotation thereof by said driving means.

3. In an apparatus for magnetically recording intelligence as a series of transverse tracks on a moving flexible magnetic tape, tape feeding means, a rotatable support located under said tape and carrying a plurality of electromagnetic transducer heads equally spaced around the circumference of said support, periodically-operated means responsive to a predetermined small movement of said tape to stop said tape automatically for a short interval of time to reduce the clearance between successive recorded transverse tracks and the paths of said heads in order to compensate for any misalignment which may have occurred due to shrinkage or expansion of said tape, so as to bring said recorded tracks back into proper synchronism with said transducer heads, automatically-operated means to thereafter start the feeding of said tape, a thermionic tube, a switch in the grid circuit of said tube, and having a resilient member engaging said tape, and arranged to make contact with said tape feeding means through a series of spaced holes in said tape in alignment with the contact of said switch to cause surges of current to flow through said grid circuit and energize the coil of said electromagnetic brake periodically.

4. In an apparatus for magnetically recording intelligence as a series of transverse tracks on a moving flexible magnetic tape, tape feeding means, a rotatable support located under said tape and carrying a plurality of electromagnetic transducer heads equally spaced around the circumference of said support periodically-operated means responsive to a predetermined small movement of said tape to stop said tape automatically for a short interval of time to reduce the clearance between successive recorded transverse tracks and the paths of said heads in order to compensate for any misalignment which may have occurred due to shrinkage or expansion or said tape, so as to bring said recorded tracks back into proper synchronism with said transducer heads, automatically-operated means to thereafter start the feeding of said tape, said tape-stopping means including slip friction means for driving said feeding roller, an electromagnetic brake for clamping said shaft to temporarily prevent the rotation thereof by said driving means, and a series of equally spaced means arranged along the length of said tape to electrically operate said brake for predetermined short periods.

5. In an apparatus for magnetically recording intelligence as a series of transverse tracks on a moving flexible magnetic tape, tape feeding means, a rotatable support located under said tape and carrying a plurality of electromagnetic transducer heads equally spaced around the circumference of said support, periodically-operated means responsive to a predetermined small movement of said tape to stop said tape automatically for a short interval of time to reduce the clearance between successive recorded transverse tracks and the paths of said heads in order to compensate for any misalignment which may have occurred due to shrinkage or expansion of said tape, so as to bring said recorded tracks back into proper synchronism with said transducer heads, automatically-operated means to thereafter start the feeding of said tape, a thermionic tube, a switch in the grid circuit of said tube, a series of spaced holes in said tape in alignment with the contact of said switch, said grid circuit switch including a metallic feed roller located under said tape, and a metallic plate having a plurality of resilient contact fingers above said tape for making switch-closing engagement with said roller whenever any one of said spaced holes in said tape is reached so as to cause surges of current to flow through said grid circuit and energize the coil of said brake periodically.

6. In an apparatus for synchronizing the transverse substantially arcuate paths electrically recorded on a moving magnetic tape by a rotating turntable having a plurality of equally spaced transducer heads on the circumference thereof, a roller for driving said tape, a normally operative driving gear having a slip friction connection with said roller, a magnetic brake for temporarily stopping the rotation of said roller while permitting said gear to continue its rotation, said brake comprising a stator including an electromagnetic coil, a shaft passing through said stator, a rotor mounted on said shaft, a clutch plate fixed to said shaft on one side of said driving gear, and a sliding clutch plate loosely connected to said shaft on the opposite side of said gear, a coiled spring for normally causing said clutch plates, to engage said gear for driving said roller, means on said tape to periodically energize said brake coil and stop the operating feed of said tape for a short time, and cam means on said turntable to deenergize said brake coil at the end of said time.

7. The invention as defined in claim 6 in which provision is made of a manually rockable eccentric roller over which said tape runs, for permitting the adjustment of the period of operation of said brake.

8. The invention as defined in claim 6, in which provision is made of a plurality of said cams located on the edge of said turntable in alignment with the position of said transducer heads.

9. In an apparatus for synchronizing the spaced tracks of a magnetically recorded tape of the type produced by a rotating turntable having a plurality of uniformly spaced transducer heads on the circumference thereof, a drive gear, a roller for feeding said tape having a slip friction connection with said drive gear, means actuated by the movement of said tape to lock said roller against rotation, and means responsive to the movement of said transducer head to the edge of said tape to unlock said roller and permit said tape to resume feeding.

10. The invention as defined in claim 9, in which said roller-locking brake is operated by a series of reference points spaced along the length of said tape.

11. The invention as defined in claim 9, in which said roller is locked against rotation by a relay-operated electromagnetic brake.

12. In an apparatus for magnetically recording and reproducing intelligence on a moving, flexible magnetic tape, means for feeding said tape through said apparatus, a rotatable circular support located under said tape and carrying a plurality of electro-magnetic transducer heads equally spaced around the periphery thereof, means for causing said heads to produce a series of transverse recorded tracks on the under surface of said tape, periodically operated means actuated at regular intervals in the movement of said tape to stop it for a predetermined short time so as to reduce the clearance between the successive, recorded, transverse tracks and the path of said transducer heads to compensate for any slight misalignment between said tracks and said path due to shrinkage or expansion of said tape which may have occurred, whereby said recorded tracks automatically will be brought back into proper synchronism with the path of said recording heads during reproduction, and cam operated means on said support to thereafter cause the feeding of said tape to be resumed whenever one of said heads reaches the edge of said tape.

References Cited in the file of this patent

UNITED STATES PATENTS

| | | |
|---|---|---|
| 462,687 | Bruening | Nov. 10, 1891 |
| 2,077,439 | Schmitt | Apr. 20, 1937 |
| 2,245,286 | Marzocchi | June 10, 1941 |
| 2,648,589 | Hickman | Aug. 11, 1953 |